United States Patent
Nakagawa et al.

[11] 3,961,931
[45] June 8, 1976

[54] APPARATUS FOR HEAT-BONDING OPTICAL FIBERS

[75] Inventors: Kenji Nakagawa, Tokorozawa; Kunimitsu Kobayashi, Yamato, both of Japan

[73] Assignee: Hoya Glass Works, Ltd., Tokyo, Japan

[22] Filed: Feb. 24, 1975

[21] Appl. No.: 552,075

Related U.S. Application Data

[62] Division of Ser. No. 482,681, June 24, 1974, abandoned.

[30] Foreign Application Priority Data

Sept. 10, 1973 Japan............................. 48-101796

[52] U.S. Cl................................. 65/152; 65/156; 65/DIG. 7
[51] Int. Cl.² ...................... C03B 23/20; C03B 9/42
[58] Field of Search................ 65/DIG. 7, 4 B, 152, 65/156

[56] References Cited
UNITED STATES PATENTS

| | | | |
|---|---|---|---|
| 3,216,807 | 11/1965 | Woodcock...................... | 65/DIG. 7 |
| 3,567,549 | 3/1971 | Hoffmeister et al. ............. | 65/4 B X |
| 3,626,040 | 12/1971 | Nagao.............................. | 65/DIG. 7 |

*Primary Examiner*—S. Leon Bashore
*Assistant Examiner*—Frank W. Miga
*Attorney, Agent, or Firm*—Sughrue, Rothwell, Mion, Zinn & Macpeak

[57] ABSTRACT

A process for heat-bonding optical fibers comprising aligning a number of optical fibers in a mould with at least one of whose end surfaces is open and with end members slidable towards the inside of the mould from positions at which the end surfaces are open whereby a gas present among the optical fibers can be discharged, heating the optical fibers and evacuating the gas in the mould, closing the open end surfaces and applying pressure to the optical fibers through a press member and the end members, thereby heat-bonding the optical fibers; and an apparatus for heat-bonding optical fibers, comprising a mould with at least one of whose end surfaces is open, and including a press member as a wall of the mould, at least one end member provided for the end surfaces of the mould, and being capable of sliding inwardly along inclined surfaces of the press member upon application of a presssure on the press member.

7 Claims, 18 Drawing Figures

APPARATUS FOR HEAT-BONDING OPTICAL FIBERS

This is a division of application Ser. No. 482,681, filed June 24, 1974, now abandoned.

BACKGROUND OF THE INVENTION

1. FIELD OF THE INVENTION

This invention relates to a method and an apparatus for heat-bonding optical fibers, and more specifically to a method and an apparatus for heat-bonding optical fibers in order to obtain light-conducting plates of reduced image-distortion and good air-tightness.

2. DESCRIPTION OF THE PRIOR ART

Light-conducting plates produced by heat-bonding a number of optical fibers are used, for example, as a faceplate of a cathode ray tube in the production of images, and the light-conducting plates for use as faceplates must have high airtightness, and reduced image distortion, and must be free from points of contamination impervious to light.

The conventional method for producing such a light-conducting plate comprises aligning optical fibers in good order in a mould with open ends, and heating the fibers under pressure thereby to bond the fibers to one another while permitting the air present in the interspaces between the fibers to escape from the open ends of the mould. According to such a method, however, the optical fibers are bent because the ends of the moulds are open. This causes a distortion of the image in the resulting light-conducting plate. Furthermore, if a pressure sufficient for producing an air-tight light-conducting plate having a thickness of, for example, 5 mm is applied, 40 to 50% of the optical fibers used are lost as a result of flowing out from the open ends of the mould. With a view to remedying this defect, various previous attempts have been made.

For example, U.S. Pat. No. 3,485,609 discloses a method which comprises closely packing optical fibers into a mould made of a material having a lower coefficient of expansion than the optical fibers, sealing the mould, and then heating the mould thereby to bond the optical fibers to one another by the difference in the coefficient of thermal expansion between the mould and the optical fibers. However, this method has defects. Firstly, since air present in the interspaces between the aligned optical fibers has difficulty dissolving in the glass constituting the optical fibers even upon application of pressure to the optical fibers, bubbles remain causing a deformation of the optical fibers. Furthermore, contaminated points impervious to light tend to be formed in the light-conducting plates produced by this method. Secondly, the mould must be made of a material having a low coefficient of thermal expansion and high strength at high temperatures. Moreover, in order for the mould to withstand high pressures, the mould should be made thick, and this involves a high cost of production.

Another prior art technique disclosed in U.S. Pat. No. 3,224,851 comprises packing optical fibers in a glass tube, heating the glass tube and evacuating air from it, and thereafter causing a high hydrostatic pressure to act on the peripheral surface of the glass tube thereby to bond the optical fibers. This method is also not free from disadvantages. A first drawback is that because of the need for applying a high fluid pressure at high temperatures to the glass tube packed with optical fibers, the pressure vessel should be of a material that is resistant to high temperatures and high pressures, and the equipment becomes very expensive. Another defect is that since the optical fibers flow toward the opening of the tube at which evacuation is being accomplished, distortion occurs at the end portion of the bonded optical fibers.

Accordingly, it is an object of this invention to provide a method and an apparatus for heat-bonding optical fibers with high efficiency to form an air-tight light-conducting plate having reduced distortion and contamination, without the need to use such a costly apparatus as described above.

SUMMARY OF THE INVENTION

This invention provides a process for heat-bonding optical fibers comprising aligning a number of optical fibers in a mould with at least one of whose end surfaces is open and with end members slidable towards the inside of the mould from positions at which the end surfaces are open whereby a gas present among the optical fibers can be discharged, heating the optical fibers and evacuating the gas in the mould, closing the open end surfaces and applying pressure to the optical fibers through a press member and the end members, thereby heat-bonding the optical fibers.

This invention also provides an apparatus for heat-bonding optical fibers, comprising a mould with at least one of whose end surfaces is open, and including a press member as a wall of the mould, at least one end member provided for the end surfaces of the mould, and being capable of sliding inwardly along inclined surfaces of the press member upon application of a pressure on the press member.

DETAILED DESCRIPTION OF THE INVENTION

A first feature of the present invention is that optical fibers are bonded to each other by aligning optical fibers in a mould having a side wall with a plurality of divided sections, providing sliding walls at the end surfaces of the optical fibers with a space between the sliding walls and the end surfaces, heating the optical fibers and evacuating the gas present in the interspaces among the fibers, pressing the optical fibers against a part of the mould thereby to bring the sliding walls into intimate contact with the end surfaces of the optical fibers and to form a closed chamber in which the optical fibers are aligned, and diminishing the volume of the closed chamber as a result of the sliding of the side wall by this pressure, thereby to bond the optical fibers.

A second feature of this invention is that when the optical fibers are being heated and the gas is being evacuated in the mould, the end surfaces of the optical fibers are open and the gas present in the interspaces among the fibers can be charged from the open surfaces, but that when a force is exerted the sliding walls slide to close the end surfaces and therefore prevent the optical fibers from flowing out of the mould.

A third feature of this invention is that since the chamber in which the optical fibers are aligned is closed at the time of heat bonding of the fibers, the optical fibers do not flow out of the mould, and there is no loss of the optical fibers, and that since no loss of order in arrangement due to the flowing of the optical fibers occurs, light-conducting plates which do not distort images can be obtained in high yields.

A fourth feature of this invention is that since the end surfaces of the optical fibers are open until immediately before heat bonding, the gas present in the interspaces between the fibers can be removed, and bubbles do not remain at the time of bonding, which results in the formation of light-conducting plates with a markedly reduced amount of contaminated points.

A fifth feature of this invention is that since the chamber in which the optical fibers are aligned is closed at the time of applying pressure and the optical fibers do not flow out from the mould upon application of pressure, it is possible to apply a high pressure to the optical fibers for prolonged periods of time and to reduce the interspaces between the fibers sufficiently, which leads to the formation of light-conducting plates of excellent air-tightness.

One example of the structure of the mould used in the performance of this invention will be described in detail by reference to the accompanying drawings.

FIGS. 1 to 4 show one example of the mould used in the performance of this invention. In these figures, the reference numeral 1 represents optical fibers, and the reference numerals 2 and 2' designate components constituting the side walls and bottom wall of the mould. The numeral 3 designates an under press member supporting the side walls and the bottom wall. An upper press member 4 is provided so as to fit between the side walls, and at the same time forms the upper wall of the mould. The reference numerals 5 and 5' are sliding end walls provided near the end surfaces 6 and 6' of the optical fibers. Clearances 7 and 7' are provided between the sliding end walls 5 and 5' and the side walls 2 and 2', respectively, and open outwardly of the walls. The reference numeral 8 represents a base supporting the entire mould. The mould members can be suitably made of iron, nickel and other heat-resisting conventional ferroalloys. A relatively weak spring 9 is provided so as to prevent the sliding walls 5 and 5' from approaching each other due to their own weight. The arrow 10 shows the direction of the force to be applied at the time of bonding the optical fibers.

Figure 1:
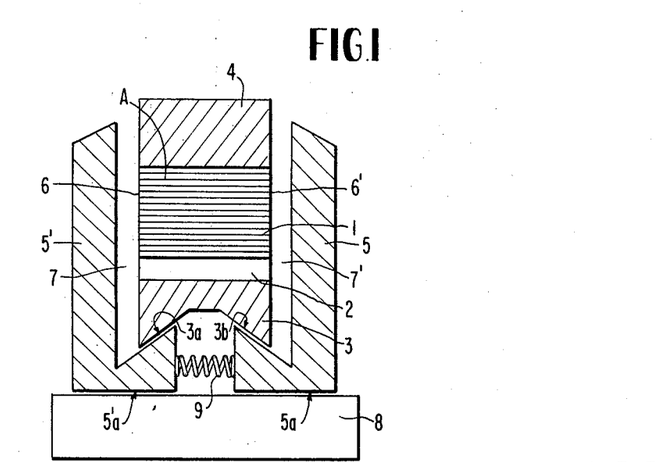
FIG. 1 is a sectional view of a mould in accordance with this invention taken along the axis of the optical fibers.
Figure 2:
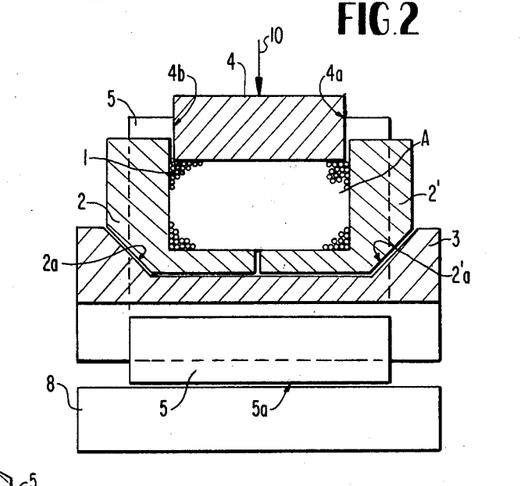
FIG. 2 is a sectional view of the mould taken at right angles to the axis of the optical fibers.
Figure 3:
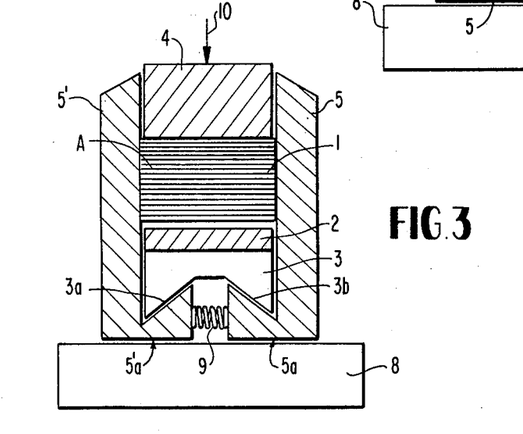
FIG. 3 is a sectional view of the mould taken along the axis of the optical fibers when pressure is applied from the direction of arrow 10.

FIG. 3 shows the state of the mould after the application of pressure in the direction of arrow 10 by a sectional view taken along the axis of the optical fibers.

Application of a relatively low pressure in the direction of arrow 10 causes the sliding end walls 5 and 5' to slide in opposing directions along surfaces 3a, 3b and 5a, 5'a and come into intimate contact with the members constituting the side walls of the mould, that is the press member 4, members 2 and 2' constituting the side walls and the bottom wall, and the base 3. This results in the closing of a chamber A in which the optical fibers are aligned. When the pressure being applied in the direction of arrow 10 is increased, the press member 4 slides along the members 2 and 2' constituting the side walls and the bottom wall of the mould to reduce the volume of the chamber A in which the optical fibers 1 are aligned and to press the optical fibers 1 from all sides. The coating of a high temperature lubricant such as boron nitride (BN) on the sliding surfaces 2a, 2'a, 3a, 3b, 4'a, 4b and 5'a and 5a is effective for facilitating the operation of the mould. Suitable alternative high temperature lubricants which can be used are heat-resisting inorganic elements or compounds which prevent adhesion between the mould metal and glass. For example, graphite, aluminum oxide, magnesium oxide and kaolinite, etc., in addition to the preferred BN, can be employed as useful lubricant materials.

FIGS. 4 to 15 show another embodiment of the mould used for the performance of the present invention.

Figure 4:
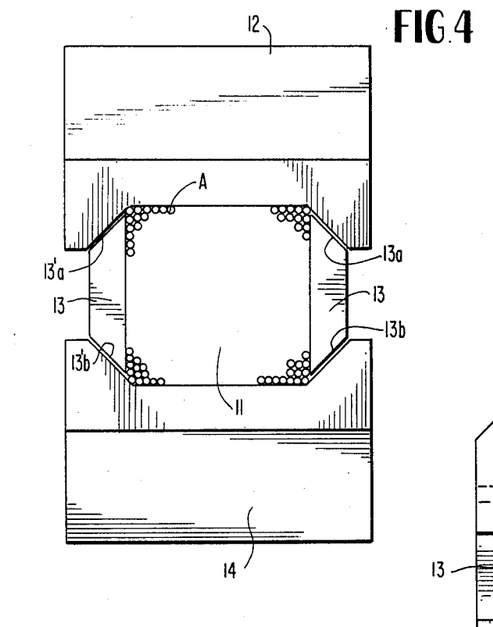
FIG. 4 is a front elevation of an inside mould in another embodiment.
Figure 5:
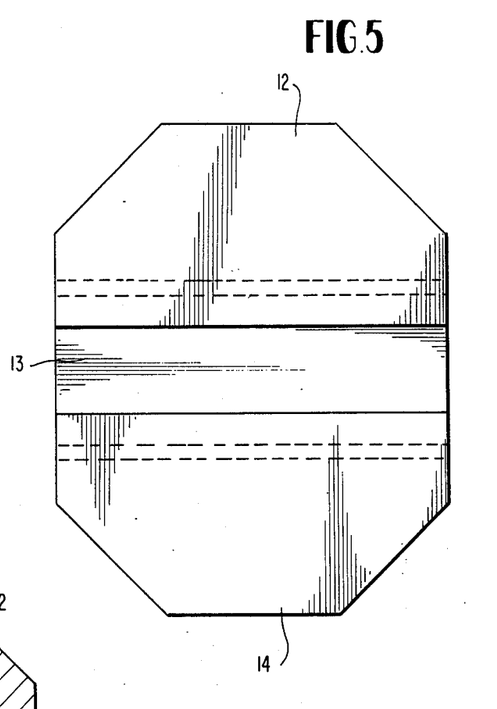
FIG. 5 is a side elevation of the inside mould shown in FIG. 4.
Figure 6:
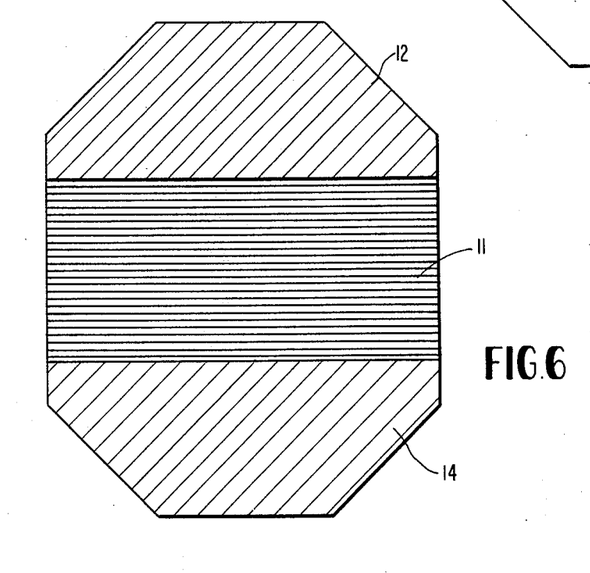
FIG. 6 is a sectional view of the inside mould taken along the axis of the optical fibers.

FIG. 4 is a front elevation of the inside components of the chamber A. FIG. 5 is a side elevation of the mould shown in FIG. 4, and FIG. 6 is a sectional view of the mould shown in FIG. 4.

In these figures, the reference numeral 11 represents optical fibers; 12, a member constituting the upper wall of the mould; and 14, a member constituting the lower wall of the mould. Sliding walls constituting the side walls are designated by 13 and 13'. The sliding side walls 13 and 13' make contact with members 12 and 13 constituting the upper and lower walls, at their surfaces 13a, 13b, 13'a, and 13'b.

Figure 7:
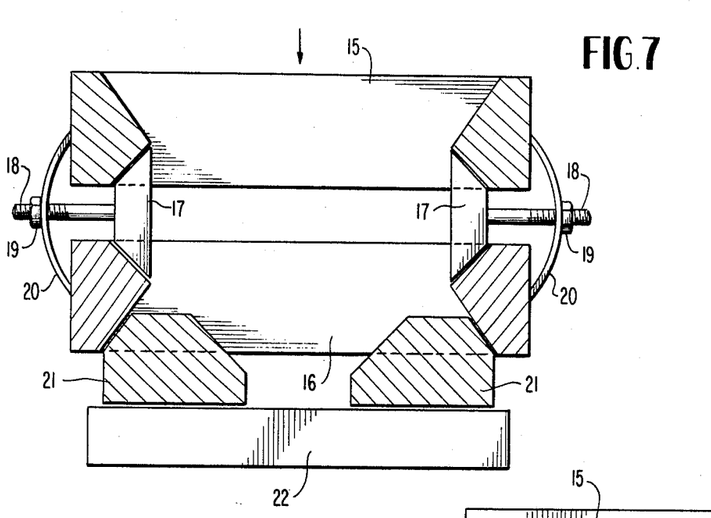
FIG. 7 is a sectional view of an outside mould.
Figure 8:
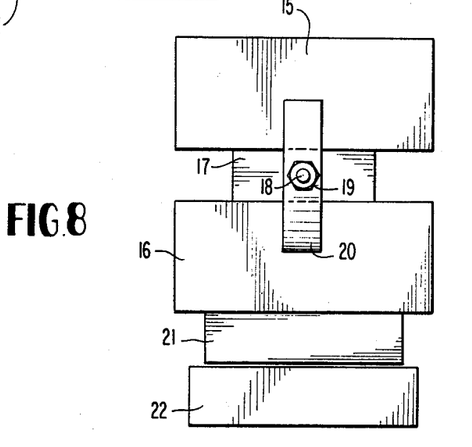
FIG. 8 is a front elevation of the outside mould.

FIG. 7 is a sectional view of an outside mould in which to place an inside mould containing the aligned optical fibers. FIG. 8 is a front elevation of this outside mould.

Figure 9:
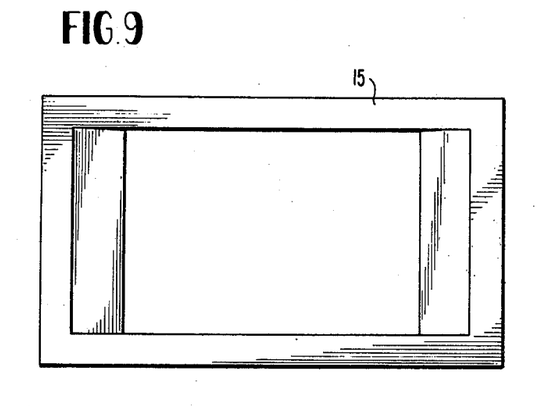
FIG. 9 is a view showing the component parts of the outside mould.
Figure 10A:
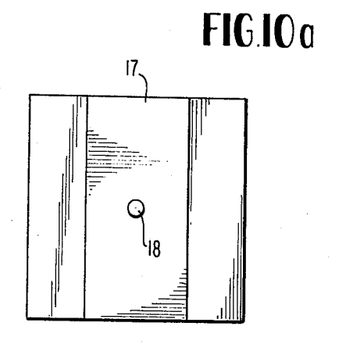
FIGS. 10a, 10b, 10c and 11a, 11b are views showing the component parts of the mould.
Figure 10B:
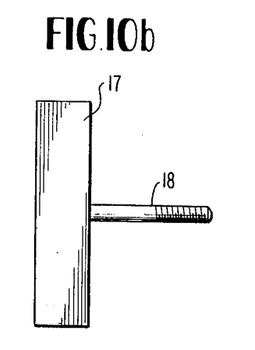
Figure 10C:
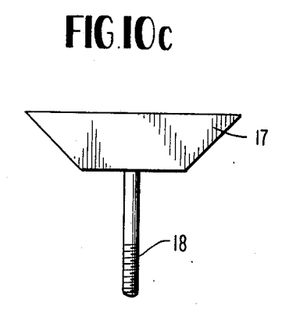
Figure 11A:
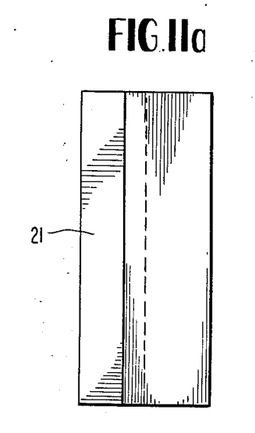
Figure 11B:
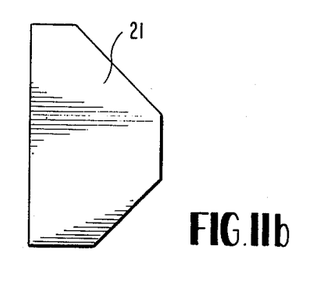

In these figures, the reference numerals 15 and 16 represent rings having the sectional shape shown in FIG. 9. The reference numerals 17 and 17' designate sliding end walls each of which has two opposing inclined surfaces and a threaded rod fixed thereto. The sliding end walls 17 and 17' are fitted between rings 15 and 16 using relatively weak plate springs 20 and 20' respectively through threaded rods 18 and 18' and nuts 19 and 19' respectively, and are adapted to slide inwardly upon the application of force on the ring 16 or 15. The ring 16 is fitted to rod members 21 and 21' of the shape as shown in FIG. 11 at the tapered portions. The reference numeral 22 is a base supporting this outside mould.

Figure 12:
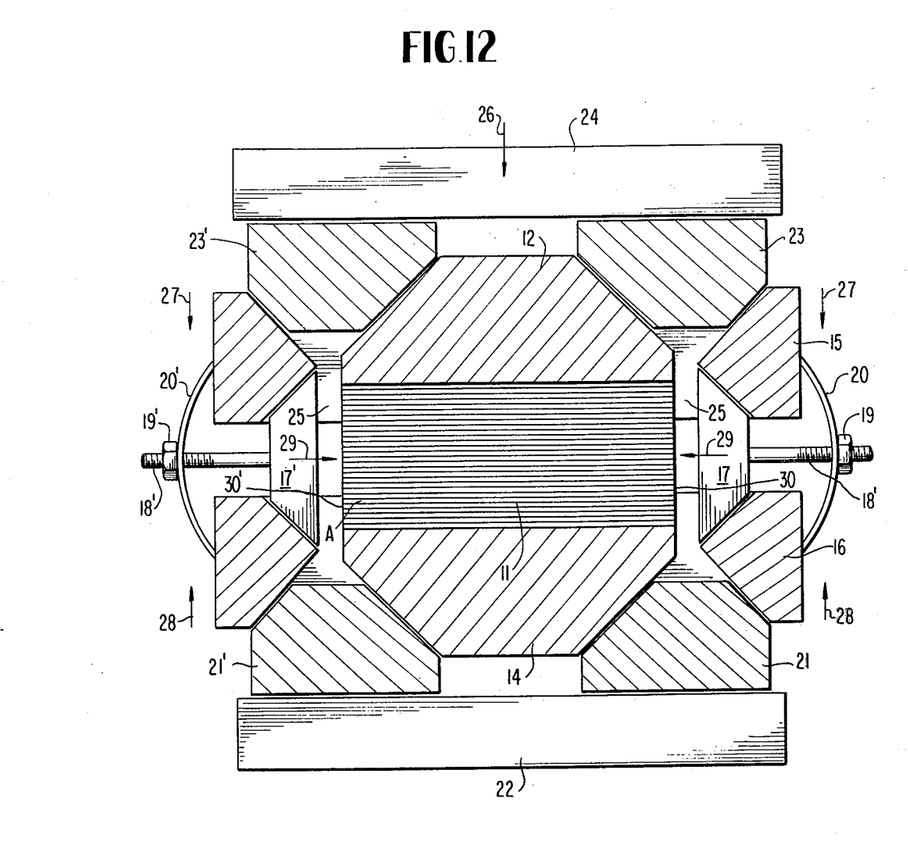
FIG. 12 is a sectional view of the mould.
Figure 13:
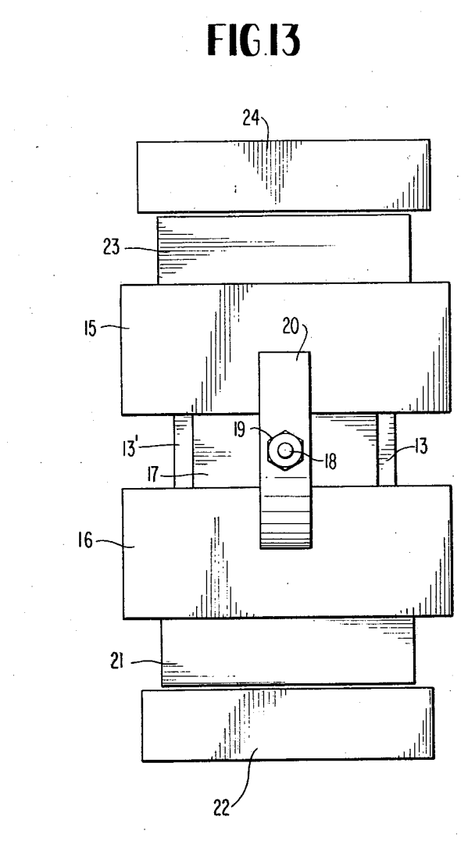
FIG. 13 is a front elevation of the mould.
Figure 14:
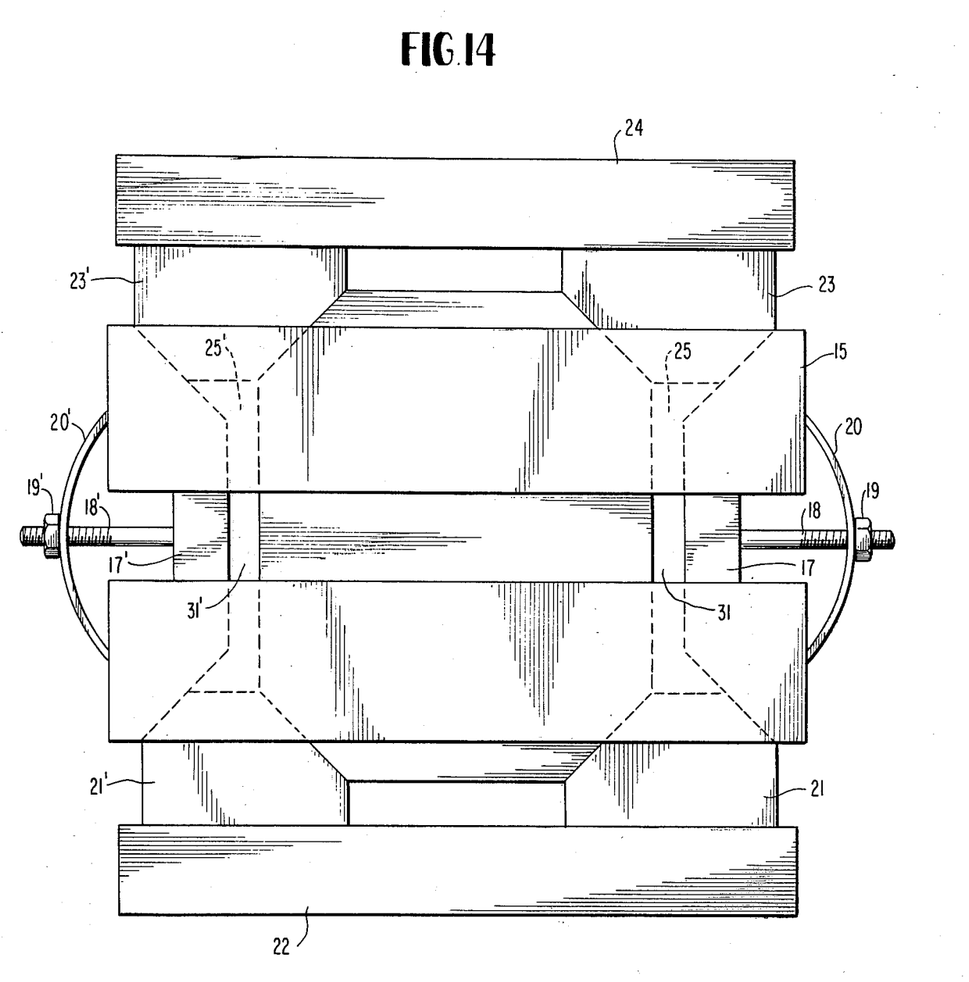
FIG. 14 is a side elevation of the mould.

FIG. 12 is a sectional view showing the state of the outside mould in which the inside mould containing the aligned optical fibers is disposed, taken along the axis of the optical fibers. FIGS. 13 and 14 are a front elevation, and a side elevation of the mould shown in FIG. 12. In these figures, the reference numerals 23 and 23' are rectangular rods fitted between the ring 15 of the outside mould and a member 12 constituting the upper wall of the inside mould. These rectangular rods 23 and 23' are of the shape shown in FIG. 11. The reference numeral 24 represents a press plate for pressing the rectangular rods 23 and 23' equally. Clearances 25 and 25' are provided between the sliding end walls 17 and 17' and the end surfaces 30 and 30' of the optical fibers, and communicate with the outside of the mould through holes 31 and 31'. The reference numeral 26 designates by an arrow the direction of applying pressure to this mould. When a weak force is applied to this mould, the relatively weak plate springs 20 and 20' stretch to move the rings 15 and 16 in the directions of arrows 27 and 28, and the sliding walls 17 and 17' in the directions of arrows 29 and 29'. As a result, the sliding end walls 17 and 17' come into intimate contact with the members 12, 13, 13' and 14 constituting the side walls to close the end surfaces 30 and 30' of the optical fibers. The press members comprise the upper press member and the under press member. The upper press member comprises members 12, 23, 23' and 24, and the under press member comprises members 14, 21, 21' and 22.

Figure 15:
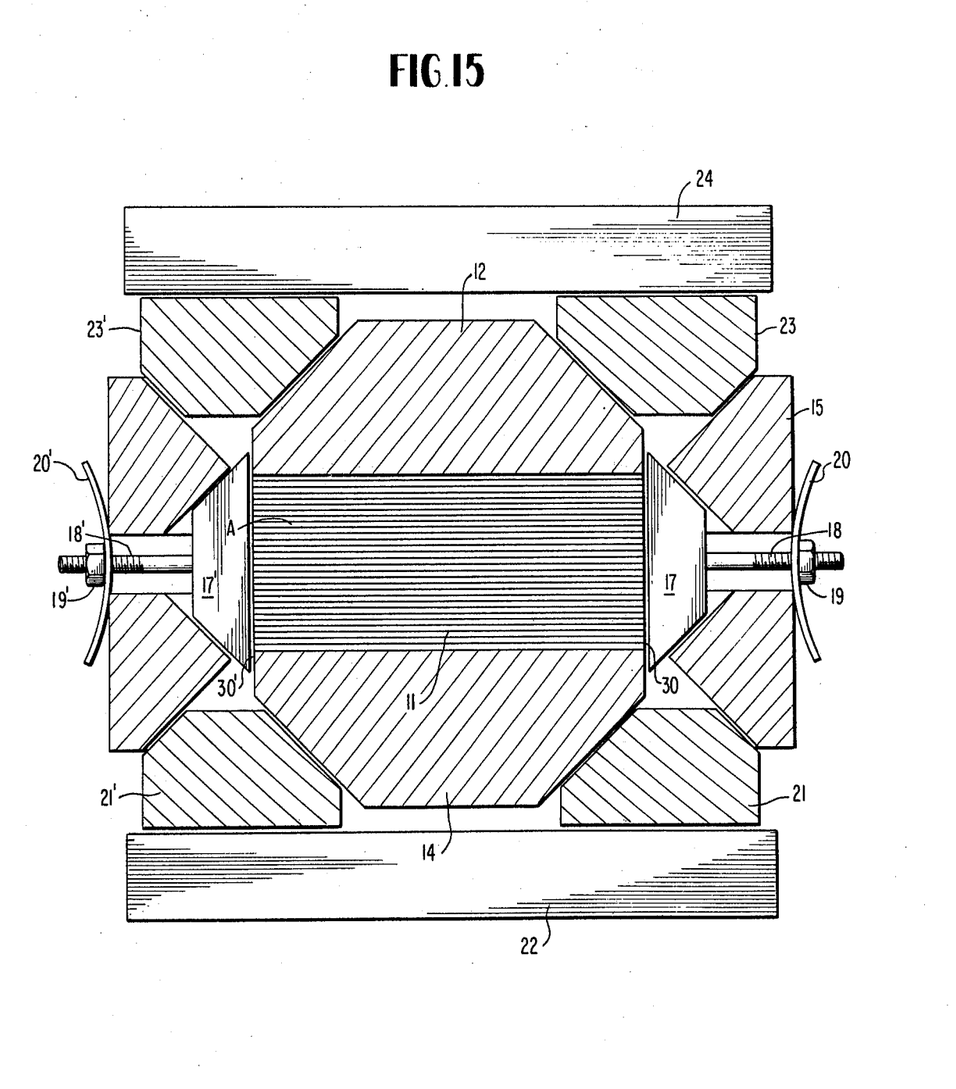
FIG. 15 is a sectional view of the mould.

FIG. 15 is a sectional view showing this condition along the axis of the optical fibers. When the pressure to be exerted on the push plate 24 is further increased, the member 12 constituting the upper wall along the axis of the optical fibers comes down, and incident to this, the sliding side walls 13 and 13' of the inside mould slide inwardly along the sliding surfaces 13a, 13b and 13'a, 13'b to reduce the volume of the chamber A containing the optical fibers aligned therein and to bond the optical fibers. If desired, a high temperature lubricant such as BN or graphite can be effectively coated on the sliding surfaces of the mould.

In the above-described embodiments of the mould, both end surfaces of the optical fibers are opened, but it is not altogether necessary that both end surfaces be opened. Thus, a mould of the type can be employed wherein before the application of pressure only one of the end surfaces is open and the other is closed, and the open end surface is closed upon the application of pressure. Such a type of mould is effective generally when the optical fibers are short and evacuation is easy.

Suitable examples of core glass which can be employed in the embodiments of this invention are as follows:

|  | No. 1 | No. 2 |
|---|---|---|
|  | (wt%) | (wt%) |
| $SiO_2$ | 33.0 | 50 |
| $B_2O_{nd\ 3}$ | 1.5 | — |
| $Na_2O$ | 1.5 | 4 |
| $K_2O$ | 3.0 | 5 |
| $Al_2O_3$ | 3 | — |
| PbO | 24 | 45 |
| BaO | 34 | — |
| Transition Temperature | 550°C | 440°C |
| Softening Temperature | 680°C | 580°C |
| Refractive Index | 1.67 | 1.62 |

Suitable examples of clad glass are as follows:

|  | No. 1 | No. 2 |
|---|---|---|
|  | (wt%) | (wt%) |
| $SiO_2$ | 67 | 74.5 |
| $B_2O_3$ | — | 17 |
| $Na_2O$ | 18 | 5.4 |
| $K_2O$ | 1 | 0.6 |
| $Al_2O_3$ | 3 | 2 |
| CaO | 7.3 | 0.2 |
| MgO | 3.7 | — |
| Transition Temperature | 520°C | 550°C |
| Softening Temperature | 700°C | 780°C |
| Refractive Index | 1.52 | 1.48 |

These glass compositions listed above are merely exemplary as will be recognized by one skilled in the art and are not to be construed as limiting the scope of the invention since the invention is broadly applicable to glass fibers in general.

The pressure suitable for employment in the process of this invention are about 20 to 600 kg/cm², preferably 50 to 400 kg/cm². Use of pressures outside of these ranges can be employed but are not preferred since lower pressures cause a imperfect heat-bonding of the optical fibers and higher pressures lead to a deformation of the mould.

A specific numerical range of suitable temperatures which can be used in this invention is difficult to define because suitable temperatures depend on the viscosity of optical fiber. Accordingly, a suitable temperatures range is from that temperature at which the viscosity of the optical fiber is about $10^{14}$ poises to that temperature at which the viscosity of optical fiber is about $10^6$ poises. A preferred temperature range is from that temperature at which the viscosity of the optical fiber is about $10^{13.4}$ poises (transition temperature) to that temperature at which the viscosity of optical fiber is about $10^7$ poises (softening temperature). Operation outside these temperature ranges are to be avoided since lower temperatures cause the optical fibers to be broken and higher temperatures lead to a flow of the optical fiber through small interspaces between the contacted pieces of the mould.

Appropriate evacuation pressure ranges which can be suitably employed are generally about 0.1 torr. to $1 \times 10^{-6}$ torr., preferably $1 \times 10^{-3}$ torr. to $1 \times 10^{-5}$ torr. Higher evacuation pressures cause the formation of points of contamination in the light-conducting plates. And with the use of lower evacuation pressures, the remarkable effects in the elimination of contamination points are not obtained.

The production of light-conducting plates using the above mould will be described in greater detail by reference the following Examples.

EXAMPLE 1

A rod having a diameter of 28 mm and made of barium lead silicate glass with a refractive index of 1.76 was placed in a tube made of soda lime glass with a refractive index of 1.52 and having an inside diameter of 30 mm and an outside diameter of 35 mm, and the tube was fed longitudinally into a heating furnace, followed by heat-softening. The heat-softened glass was elongated to form optical fibers having a diameter of 1 mm and a length of 30 cm. These optical fibers were collected into a bundle with a diameter of 4 cm, and again placed in the heating furnace. The bundle was heat-softened and elongated from one end to form a bundle of optical fibers with a diameter of 1 mm. The transition point and softening point of these optical fibers were 540°C and 680°C, respectively.

This optical fiber bundle was arranged in a heat-resistant steel mould of the structure shown in FIGS. 1 to 4, and the mould was placed in a vessel which could be evacuated. The vessel was placed in an electric furnace, and heated from room temperature to 500°C to oxidize any organic contaminants adhering to the surface of the optical fiber bundle. Then, a rotary vacuum pump and an oil diffusing pump were connected to the vessel, and the vessel was heated to 580°C while maintaining the vessel under vacuum. When the optical fiber bundle was maintained at this temperature for 30 minutes, the pressure in the vessel was lowered to $2 \times 10^{-4}$ torr. Subsequently, pressure was gradually applied to the press member 4 using a hydraulic press. The pressure was increased to 200 kg/cm$^2$ in the course of 15 minutes, and the optical fiber bundle was maintained at this pressure for 150 minutes. Then, the pressure was removed, and the temperature was increased to 650°C. The optical fiber bundle was then maintained at this temperature for 5 hours so that the spaces between the optical fibers became spherical, and cooled to room temperature. No flowing of the bonded optical fibers from the mould was observed. The bonded optical fibers were cut and polished, and the distortion of an image was examined. As a result, the distortion of the image was observed only in a layer having a thickness of 2 mm which had been in contact with the sliding walls 5 and 5'. The bonded optical fibers were cut to a thickness of 5 mm, and polished to form a light-conducting plate. The air-tightness of the light-conducting plate was examined using a helium leak detector. It was found that this light-conducting plate was completely air-tight at not more than $5 \times 10^{-11}$ torr. cc/sec. The largest point of contamination included in this light-conducting plate had a diameter of 150 microns, and there were only 4 contaminated points with a diameter of 50 to 150 microns per 10 cm$^2$.

EXAMPLE 2

An optical fiber bundle prepared in the same way as in Example 1 was arranged in a heat-resistant mould of the structure shown in FIGS. 1 to 4, and was placed in a vessel which could be evacuated. The vessel was placed in an electric furnace and heated in air to 550°C and a rotary vacuum pump and an oil diffusing pump were connected to the vessel. With evacuation, the temperature was increased to 650°C, and the optical fibers were maintained at this temperature for 20 minutes. The pressure inside of the vessel at this time was $3 \times 10^{-4}$ torr. The press member 4 was gradually pressed using a hydraulic press, and the pressure was increased to 100 kg/cm$^2$ in about 10 minutes. The optical fibers were maintained at this temperature for 2 hours. Then, the pressure was released, and the temperature was reduced to room temperature. No flowing of the bonded optical fibers from the former was observed. The bonded optical fibers were cut and polished, and the distortion of an image was examined. As a result, only a slight distortion of the image was observed in a layer having a depth of 3 mm which had been in contact with the sliding walls 5 and 5'.

The optical fibers so bonded were cut to a thickness of 4 mm and polished to produce a light-conducting plate. The air-tightness of the light-conducting plate was examined using a helium leak detector. The amount of leakage was found to be less than $5 \times 10^{-11}$ torr.cc/sec, and the plate was completely air-tight. The largest point of contamination included in this light-conducting plate had a diameter of 125 microns, and there were only 4 contaminated points having a size of 50 to 125 microns per 10 cm$^2$.

EXAMPLE 3

An optical fiber bundle prepared in the same way as described in Example 1 was arranged in a heat-resistant steel mould having the structure shown in FIGS. 4 to 15, and the mould was placed in a vessel which could be evacuated.

The vessel was placed in an electric furnace, and heated in air to 580°C. Then, a rotary vacuum pump and an oil diffusing pump were connected to the vessel. With evacuation, the temperature was again increased to 640°C and the optical fibers were maintained at this temperature for 30 minutes, after which the temperature was reduced to 600°C. The pressure within the vessel reacted $8 \times 10^{-5}$ torr. The stand 24 was gradually pressed by a hydraulic press, and the pressure was increased to 200 kg/cm$^2$ in 20 minutes. The optical fibers were maintained at this pressure for 1 hour, and the temperature was raised to 660°C. The optical fibers were maintained further for 1 hour at this temperature. After the pressure was released, the optical fibers were cooled to room temperature.

No flowing of the bonded optical fibers from the mould was observed. The bonded optical fibers were cut and polished, and the distortion of an image was examined. As a result, only a slight distortion was observed in a layer having a depth of 2 mm which had been in contact with the sliding walls 17 and 17'. Then, a light-conducting plate was prepared by cutting the bonded optical fibers to a thickness of 5 mm and polishing the plate. The air-tightness of the light-conducting plate was examined using a helium leak detector. It was found that the amount of leakage was less than $5 \times 10^{-11}$ torr.cc/sec, and the plate was completely air-tight.

The largest point of contamination included in the light-conducting plate was 100 microns in diameter, and there were only 3 contaminated points having a size of 50 to 100 microns per 10 cm$^2$.

EXAMPLE 4

An optical fiber bundle prepared by the same method as described in Example 1 was arranged in a heat-resistant steel mould of the structure shown in FIGS. 4 to 15, and placed in a vessel which could be evacuated. The vessel was placed in an electric furnace, and heated in air to 450°C. Then, a rotary vacuum pump and an oil diffusing pump were connected to the vessel. With evacuation, the temperature was increased to 650°C, and the optical fibers were maintained at this temperature for 20 minutes. The pressure inside the vessel was $1 \times 10^{-4}$ torr. The pressure on the press member 24 was gradually increased using a hydraulic press, and in 10 minutes, the pressure was increased to 300 kg/cm$^2$. The optical fibers were maintained at this pressure for 3 hours, and then, the temperature was decreased to 560°C. The pressure was released, and the optical fibers were cooled to room temperature. No flowing of the bonded optical fibers from the mould was observed. Then, the bonded optical fibers were cut and polished, and the distortion of an image was examined. As a result, only a slight distortion was observed in a layer having a depth of 2 mm which had been in contact with the sliding walls 17 and 17'.

Then, the bonded optical fibers were cut to a thickness of 4 mm and polished to form a light-conducting plate. The airtightness of the resulting light-conducting plate was examined using a helium leak detector. It was found that the amount of leakage was less than $5 \times 10^{-11}$ torr.cc/sec, and the plate was completely airtight. The largest point of contamination included in this light-conducting plate had a diameter of 100 microns, and there were only 2 contaminated points having a size of 50 to 100 microns per 10 cm².

As described hereinabove, according to the process of this invention, the optical fibers do not flow out of the mould at the time of heat-bonding, and there is only a very small portion at which distortion occurs in an image transmitted. While with the conventional mould in which both end surfaces of the optical fibers are open the loss of optical fibers at the time of heat-bonding is as much as 40 to 50%, the process of the present invention has made it possible to reduce this loss to 10% or less. Furthermore, according to the process and apparatus of this invention, a high pressure can be applied to the optical fibers for prolonged periods of time at the time of heat-bonding, and therefore, light-conducting plates of good air-tightness can be obtained. Also, light-conducting plates having a reduced number of points of contamination can be obtained with high efficiency. The process of this invention is, therefore, very superior as a process for producing light-conducting plates for use as face-plates of cathode ray tubes.

While the invention has been described in detail and with reference to specific embodiments thereof, it will be apparent to one skilled in the art that various changes and modifications can be made therein without departing from the spirit and scope thereof.

We claim:

1. A mold apparatus for heat bonding optical fibers comprising:

An upper press member forming one side wall of said mold;

A lower press member having a plurality of inclined surfaces disposed thereon;

At least one end member forming an end wall of said mold and having a surface capable of sliding inwardly along one of said plurality of inclined surfaces of said lower press member upon the application of pressure from said upper press member; and At least one side member forming another side surface of said mold and having a surface capable of sliding inwardly along another of said plurality of inclined surfaces of said lower press member upon the application of pressure from said upper press member whereby the side and end walls of said mold uniformly compress the optical fibers contained in the mold along each side and the ends thereof.

2. The apparatus of claim 1 wherein said mold comprises a second end member, each of said end members having a surface compatible with a corresponding inclined surface of said lower press member such that each end member moves toward the other upon the application of pressure from said upper press member.

3. The apparatus of claim 1 wherein said mold comprises a second side member, each of said side members having a surface compatible with a corresponding inclined surface of said lower press member such that each side member moves towards the other upon the application of pressure from said upper press member.

4. The apparatus of claim 3 wherein each side member comprises two inner wall sections orthogonal to each other such that the combination of side members and said upper press member defines a parallelogram circumscribing said optical fibers.

5. The apparatus of claim 4 wherein said mold comprises two end members, each end member having a surface compatible with a corresponding inclined surface of said lower press member such that each end member moves toward the other upon the application of pressure from said upper press member.

6. The apparatus of claim 5 further including means to urge said side members in separation from each other.

7. The apparatus of claim 1 further comprising: spring means coupling said side member and said upper press member, and rod means disposed on said end member and joined to said spring means to align said side members and end member.

* * * * *